W. E. BELLION.
STEAM GENERATOR.
APPLICATION FILED MAR. 19, 1917.

1,274,233.

Patented July 30, 1918.

Inventor
William E. Bellion
By his Attorneys
Hauff & Barland

UNITED STATES PATENT OFFICE.

WILLIAM E. BELLION, OF BROOKLYN, NEW YORK, ASSIGNOR OF ONE-HALF TO HENRY W. CHRISTMAN, OF JAMAICA, NEW YORK.

STEAM-GENERATOR.

1,274,233.

Specification of Letters Patent. Patented July 30, 1918.

Application filed March 19, 1917. Serial No. 155,725.

*To all whom it may concern:*

Be it known that I, WILLIAM E. BELLION, a citizen of the United States, residing at Brooklyn, county of Kings, and State of New York, have invented new and useful Improvements in Steam-Generators, of which the following is a specification.

This invention relates to a device which can be applied to internal combustion engines, and it provides a steam generator mounted on the exhaust manifold, with means connected to the generator for injecting a jet of steam into the intake pipe of the engine.

The invention is designed to obviate soot deposits in the combustion space due to faulty vaporization and it insures a fuel mixture that will at all times explode under different temperature conditions. It is well known that a low temperature of the fuel mixture interferes with the effective working of the engine, and it is the fundamental object of this invention to inject superheated or practically dry steam into the combustible before it is exploded.

The invention also includes means connected to the steam heater for controlling the amount of steam injected into the intake pipe and a gage for registering the pressure.

The novel features of the invention are more fully described in the following specification and claim and illustrated in the accompanying drawing in which:

Figure 1:
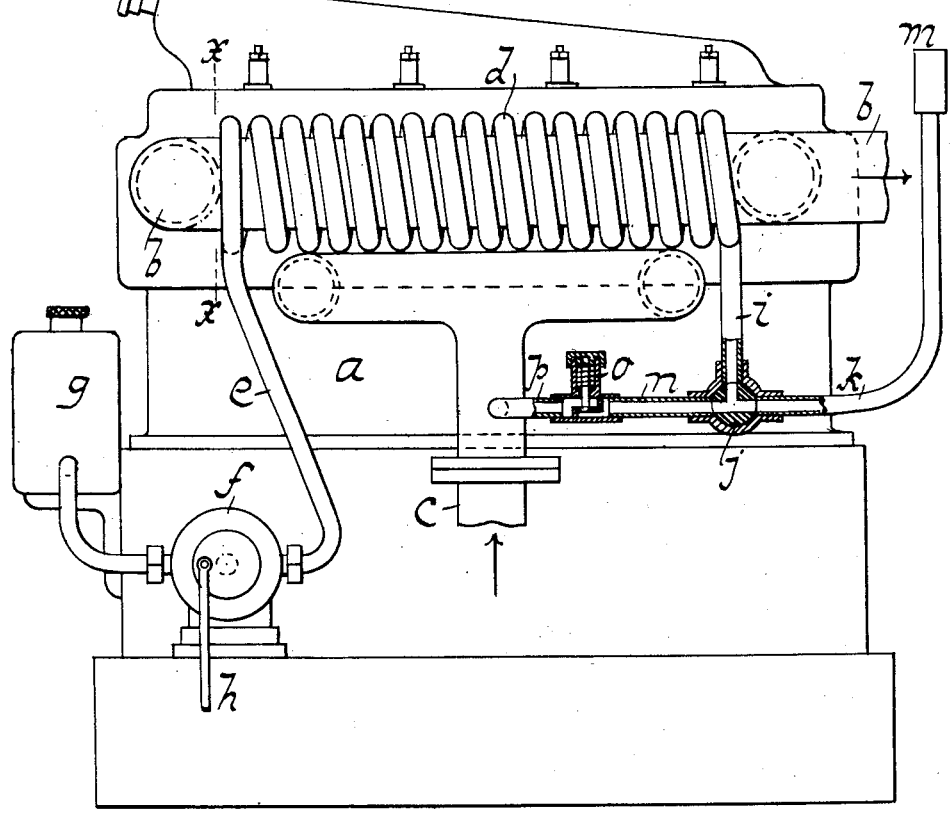
Figure 1 represents a side elevation of an engine embodying this invention.
Figure 2:
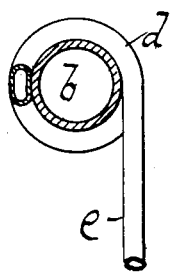
Fig. 2 is a vertical detailed transverse section taken along the line $x$ $x$ of Fig. 1.

In this drawing the letter $a$ designates a casing which forms a series of cylinders of an internal combustion engine as is well known. The engine is provided with the customary exhaust manifold $b$ to permit the products of combustion to escape and an intake manifold $c$ for admitting the combustible into the cylinders. On the exhaust manifold is arranged a coiled pipe $d$ having one end $e$ connected to a circulating pump $f$ leading to a tank $g$ adapted to contain water. The pump can be operated by means of a connecting rod $h$ or otherwise from the crank shaft of the engine.

The other end $i$ of the coiled pipe leads to a three way valve $j$ one of the ways leading by means of a pipe $k$ to a steam gage $m$ for denoting the pounds pressure generated in the coil. A pipe $n$ leads from another way of the valve $j$ to a spring safety valve $o$ and a pipe $p$ connects the valve to the intake manifold $c$ of the engine.

When the engine is in operation it actuates the pump to circulate the water in the convolutions of the coil $d$ and the heat generated by the products of combustion passing through the exhaust manifold will convert the water into superheated steam. The steam flowing into the fuel intake pipe from the coil is controlled by the safety valve $o$ which opens when the steam reaches a certain pressure to mix with the fuel flowing through the intake manifold into the cylinders. The three way valve can be closed when it is desired to shut off the steam from the coil to the intake pipe, but it can remain open from the coil to the gage while generating the steam. The numerous convolutions of the coil being in close contact with the circumference of the exhaust manifold pipe will prevent radiation of heat from the pipe and will give large heating surface.

It will be readily understood that the convolutions of the coil cover approximately the entire surface of the exhaust manifold; but it should be noted, that the coil could be made in the form of a jacket to surround the exhaust pipe with the same result as to the utilization of the heat from the products of combustion to convert the water into steam.

I claim:—

In a steam generator the combination with an internal combustion engine having an intake and exhaust manifold, of a steam generating coil arranged on the exhaust manifold, a water tank connected to the coil, a pump for forcing the water through the coil, a pipe connected to one end of the coil and leading to the intake manifold, a three way valve for shutting off or opening the coil from the intake pipe, a gage leading from the valve for denoting the pressure in the coil and a safety valve for controlling the pressure at which the steam will flow from the coil to the intake pipe.

In testimony whereof I have hereunto set my hand in the presence of two subscribing witnesses.

WILLIAM E. BELLION.

Witnesses:
WILLIAM MILLER,
GRACE DE VOE.